May 29, 1962 W. A. FRY 3,036,811
ULTRA HIGH VACUUM VALVE
Filed Feb. 17, 1961 2 Sheets-Sheet 2
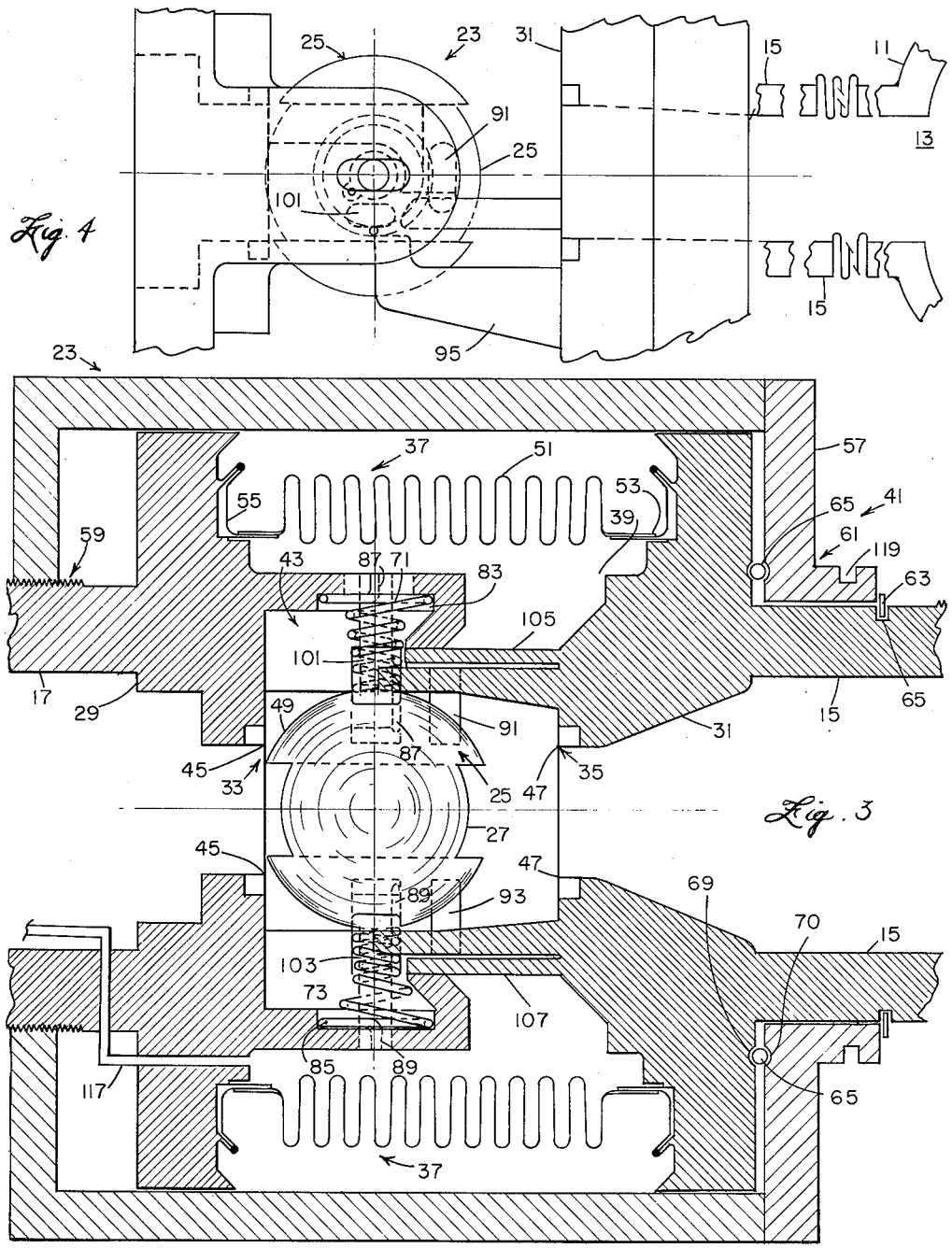
OPEN
INVENTOR.
WILLIAM A. FRY
BY United States Patent Office 3,036,811
Patented May 29, 1962

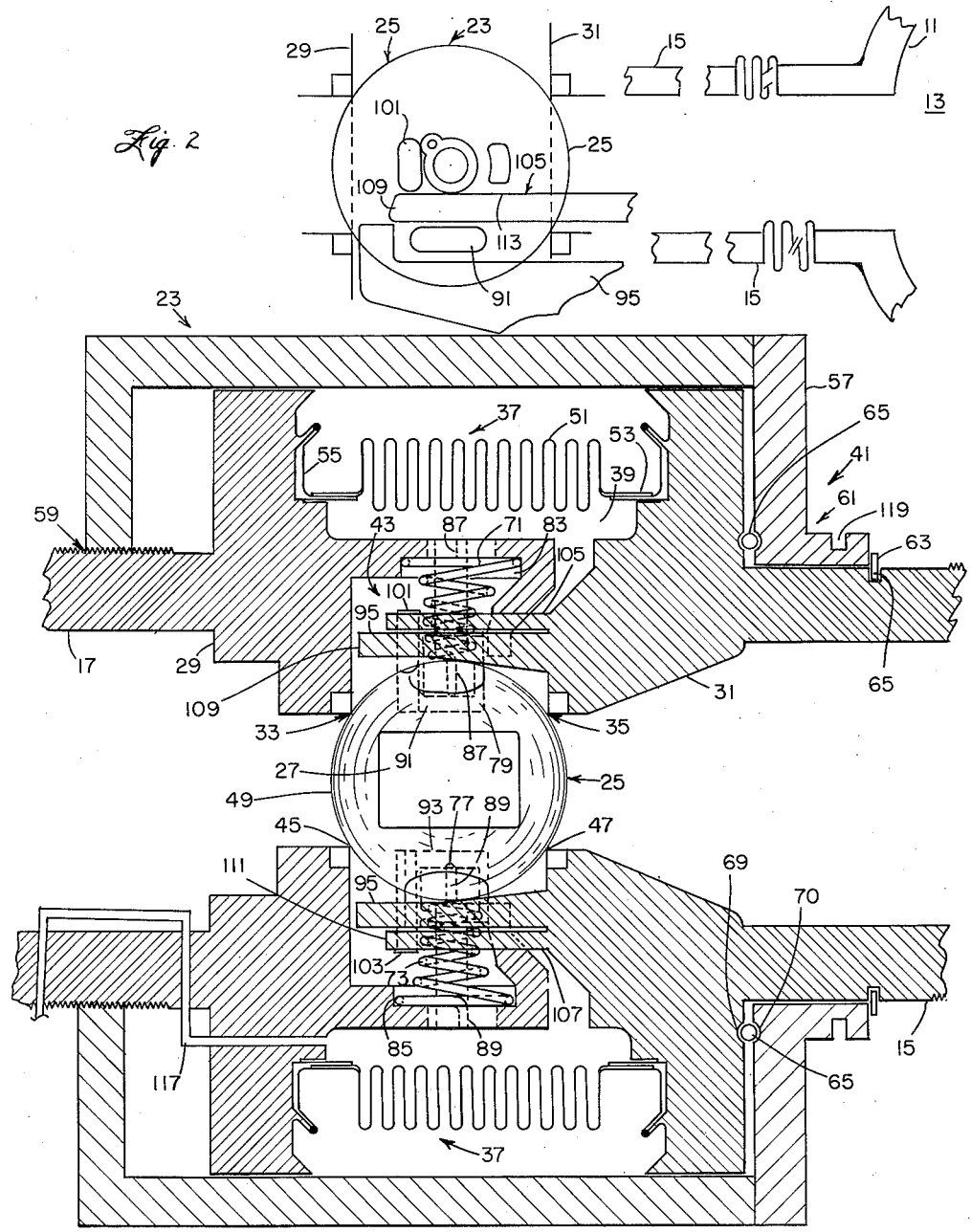

3,036,811
ULTRA HIGH VACUUM VALVE
William A. Fry, Jamison, Pa., assignor to the United States of America as represented by the United States Atomic Energy Commission
Filed Feb. 17, 1961, Ser. No. 90,151
3 Claims. (Cl. 251—160)

This invention relates to valves and more particularly to valves for opening and closing duct sections that communicate with chambers evacuated to low pressures.

Various apparatus has been well known for providing chambers with very low pressures therein. Such high vacuum means have been valuable in removing impurities from various nuclear and chemical reactors so that the reactants therein could be closely controlled. This has arisen as regards thermonuclear reactors because the presence of even small amounts of impurities of moderate or high atomic number in the reactor has increased the energy loss and has increased the kinetic temperature necessary for achieving a net production of energy. The production of high vacuums has also been valuable in high energy particle accelerators such as bevatrons, cosmotrons and synchrotrons, and in the production of vacuum gauges, vacuum tubes and other industrial devices.

Conventional systems for evacuating a chamber have included a container, a pump for evacuating the container and a valve for throttling the pump lines, for controlling the input of materials into the chamber and for completely shutting off the pump and other lines to the chamber. In thermonuclear reactors such as the model C Stellarator described in "Controlled Thermonuclear Reactions" by Glasstone and Lovberg, it has been advantageous to have a container and valves that are bakeable at a temperature of 450 degrees centigrade for twelve hours to drive gas particles from the walls of the container and valves. This has been necessary in order to achieve ultra-low chamber pressures of as low as $2 \times 10^{-10}$ millimeters of mercury. It has also been necessary in the C Stellarator to limit the permissible leakage rate of the container and valves to less than $1 \times 10^{-10}$ atmosphere cc./sec. when the inside of the container and valves has been at the mentioned ultra low pressure and the outside of the container and valves has been at atmospheric pressure. Additionally, it has been advantageous to look through a valve connected to an evacuated container to view the reactants inside of the container.

One high vacuum valve known heretofore that has been used for various of the above-mentioned purposes has had a hollow ball turnably seated against mating orifices on opposite sides of the ball but the seating pressure against the ball when the valve has been closed has either been too small, such that the valve has been ineffective to prevent leakage across the seat sufficiently, or too great, such that it has been difficult or impossible to turn the ball sufficiently to open the valve. Moreover friction from turning the ball against the seat has resulted in severe problems of wear and short effective seat or ball sealing life. Also the turning means for turning the ball has been gasketed through the valve body and the seating pressure between the turning means, gasketing and valve body has been either too small to effectively prevent leakage sufficiently or too great such that it has been difficult to turn the ball. Additionally, the friction between the turning means, gasketing and valve body has caused severe problems of wear and short effective gasket sealing life. These wear problems also necessitated complicated and expensive seat and gasket adjustment take-up means and frequent maintenance which has been expensive or unsatisfactory due to errors inherent in the manual adjustment required. Also the valves known heretofore have been complicated or have not been bakeable.

According to this invention, a simple bakeable valve is provided that eliminates the problems known heretofore that have been associated with the rotation of a ball against a stationary seating surface and eliminates the problems known heretofore that have been connected with the movement of the ball with means passing through the valve body. More particularly, this invention provides a bakeable valve, comprising a resilient temperature resistant ball formed with an aperture therethrough, temperature resistant means enclosing a space and having members formed with orifices that are moveable relatively toward and away from each other to compress and release the ball in the space, and means enclosed in said space that are operable upon movement of said members for rotating the ball to prevent a line of sight through said orifices and said aperture when the ball is compressed by said members thereby to close said valve and for rotating said ball to present a line of sight through said orifices and said aperture when the ball is released by said members thereby to open said valve.

The above and further novel features of this invention will appear more fully from the following detailed description when the same is read in connection with the accompanying drawings. It is to be expressly understood, however, that the drawings are not intended to be a definition of the invention but are for the purpose of illustration only.

FIG. 1 is a partial cross-section of the valve of this invention in a closed position;
FIG. 2 is a partial top view of FIG. 1;
FIG. 3 is a partial cross-section of the valve of FIG. 1 in an open position;
FIG. 4 is a partial top view of FIG. 3.

Referring to FIG. 1, a conventional container 11, partially shown for ease of explanation, forms a chamber 13, also partially shown for ease of explanation. One such chamber is formed by the torus-shaped container or endless tube 11 in the C-Stellarator which, as is well known, is adapted to produce, contain, and react high temperature plasma particles. A pump (not shown) evacuates chamber 13 through ducts 15 and 17 or like ducts and it has been necessary to provide a bakeable valve between the ducts 15 and 17 that can open and close selectively to provide a line of sight through the ducts and to maintain a high vacuum in chamber 13. Additionally, a bakeable valve has been required to control the introduction of small amounts of gas particles into chamber 13 from a suitable source (not shown) connected to duct 15 or a like duct. Conventional practice has been to use a valve with a ball in rotatable frictional contact with a stationary seat but these and other valves known heretofore could not satisfactorily meet high vacuum conditions, such as encountered in the C Stellarator, were complicated, or required expensive and frequent maintenance.

In accordance with this invention, as shown in FIG. 1, a valve 23 is provided that comprises generally a temperature resistant resilient rotatable ball 25 formed with an aperture 27 therethrough, temperature resistant cylindrical members 29 and 31 having orifices 33 and 35 therethrough, a temperature resistant flexible sealing means 37 connecting said members so as to enclose a space 39 around the ball 25, means 41 for moving the members 29 and 31 relatively toward and away from each other selectively to compress and release the ball 25 in the space 39, and means 43 enclosed in the space 39 by the members 29 and 31 and operable upon movement of the members 29 and 31 for rotating the ball 25 to prevent a line of sight through the orifices 33 and 35 and the aperture 27 when the ball 25 is compressed by said members 29 and 31 thereby to close the valve 23 and for rotating the ball 25 to present a line of sight through the orifices 33 and 35 and the aperture 27 when the ball 25 is released by the members 29 and 31 thereby to open the valve 23.

Advantageously, a spring type material for the ball 25 and the passageway 27 through the ball make the ball surface resilient, for example, such that sharp edge 45 of orifice 33 and sharp edge 47 of orifice 35 slightly and resiliently deflect the surface 49 of ball 25. To this end, the ball is advantageously made of high temperature Inconel X brand spring material made by the International Nickel Company and contains carbon, nickel, chromium, iron, cobalt, titanium, manganese, silicon and aluminum. This material will exert a resilience and provide a spring or "take up" dimension for prolonged orifice sealing. Moreover, this material is resistant to high temperatures up to over 450 degrees centigrade. Also, advantageously, the aperture 27 through ball 25 has a rectangular cross-section but the cross-section thereof may be other shapes such as circular. The axis of aperture 27 is at right angles to the axis of rotation of ball 25 and is adapted to correspond with and be turned at an angle to the axis of orifices 33 and 35 as described in more detail hereinafter.

Members 29 and 31 have high temperature ring shaped portions with sharp edges 45 and 47 forming orifices 33 and 35. Advantageously, the members are made of steel with inserts of soft minimum coalescence materials such as copper, or silver forming the orifices.

Flexible sealing means 37 for connecting members 29 and 31 comprises an annular high temperature metallic resilient bellows 51 fixed between members 29 and 31 such as by silver soldering end bent portions 53 and 55 so as to form a part of members 29 and 31 and so as to bound and enclose space 39. The bellows 51 permit the members 29 and 31 to move freely relatively toward and away from each other while permitting space 39 to be completely closed when members 29 and 31 compress ball 25.

The means 41 that moves members 29 and 31 relatively toward and away from each other comprises a housing 57 threaded on member 29 at one end 59 thereof and slideably engageable with member 31 at the other end 61 thereof. Split ring 63 fits in a groove 65 in member 31 and slideably engages housing 57 so that when housing 57 rotates to move the end 61 thereof away from member 29 the housing 57 moves the member 31 in the same direction and members 29 and 31 release the ball 25. When housing 57 rotates to move in the opposite direction, end 61 thereof contacts balls 65 to move member 31 toward member 29 and members 29 and 31 compress the ball 25. When housing 57 rotates in this direction the housing slideably engages balls 65 and these balls rotate in fitted holes 69 in member 31 and slide in circular groove 70 in housing 57.

The rotating means 43 that rotates ball 25 in space 39 includes springs 71 and 73 for rotating ball 25 in a first direction. The springs 71 and 73 have bent extensions 87 and 89 positioned in suitable holes in ball 25 and member 29 and the springs are assembled under a tension so as to tend to rotate ball 25 in one direction. When members 29 and 31 compress ball 25 the axis of aperture 27 is at right angles to the axes of orifices 33 and 35 as described in more detail hereinafter. When members 29 and 31 release ball 25, springs 71 and 73 provide sufficient torsion to rotate ball 25. Additional rotation of ball 25 in the same direction is provided by pins 91 and 93 carried by opposite sides of ball 25 and at least one hooked arm 95 carried by member 31 so that, if necessary, ball 25 is broken loose from orifices 33 or 35 after ball 25 is released from members 29 and 31. To this end, sufficient movement of member 31 away from member 29 causes hooked arms 95 to contact pins 91 and 93 and the further movement of member 31 in that direction causes the pins and springs 71 and 73 to turn ball 25 until the axis of aperture 27 lines up with the axes of orifices 33 and 35.

Springs 71 and 73 also resiliently and torsionally center ball 25 between members 29 and 31. To this end, cylindrical cut-outs 83 and 85 hold springs 71 and 73 in member 29 and like cut-outs (not shown) hold the springs in ball 25, so as to resiliently center ball 25 between members 25 and 31 and the axis of aperture 27 in the plane of the axes of orifices 33 and 35.

The elements of means 43 for rotating ball 25 oppositely in a second direction opposite to the direction of rotating caused by springs 71 and 73 include two rods 101 and 103 held fixed by opposite sides of ball 25, and two rod-shaped actuators 105 and 107 carried by member 31 and adapted to contact the rods 101 and 103. The movement of member 31 toward member 29 causes the actuators 105 and 107 to move the rods 101 and 103 and the ball 25 with which they are connected around the axis provided by springs 77 and 73. This latter movement is controlled further such that the axes of the ball passageway 27 is held at right angles to the axes of orifices 33 and 35 for a period of time during which the member 31 is moving toward member 29 just before the members 29 and 31 compress ball 25. To this end, the ends of actuators 105 and 107 have tapered portions 109 and 111 as shown in FIG. 2 and movement thereof against rods 101 and 103 causes the rotation of ball 25, until the ends 109 and 111 move past the rods 101 and 103. Thereupon, flat portions 113 inside of actuators 105 and 107 as shown in FIG. 2 contacts the rods so that further movement of the actuators holds the ball 25 against the tendency of the springs 71 and 73 to rotate the ball 25. When member 31 moves away from member 29 the springs 71 and 73 move rods 101 and 103 against actuators 105 and 107 and the actuators act as "stops" to limit the rotation of ball 25. The movement of member 31 in one direction thus controls the rotation of ball 25 in one direction.

The operation of valve 23 may be described wth reference to a cycle in which the valve is closed and thereafter opens and closes again. In the closed position, as shown in FIG. 1, housing 57 exerts a force against members 29 and 31 to hold the surface 49 of ball 25 compressed equally between the sharp edges 45 and 47 forming orifices 33 and 35. When so compressed the axis of the ball aperture 26 is at right angles to the axes of orifices 33 and 35. Thus members 29 and 31 and bellows 51 completely close space 39 and close valve 23 so that gas can not pass from passageway 17 to duct 15 or vice versa. A fore-vacuum provided by a conduit 117 connected between space 39 and a pump (not shown) maintains a vacuum in space 39 should any gas leak into space 39.

To open valve 23, housing 57 rotates on the threaded portion of member 29 at the end 59 thereof, to move housing 57 against split ring 63 and to move member 31 relatively away from member 29 (to the right in FIG. 1). This breaks the ball 25 loose from at least one orifice 33 or 35. Advantageously, a suitable spacer wrench inserted in a suitable hole such as hole 119 in housing 57 provides adequate torque to turn housing 57. Member 31 moves a short distance in this direction before the hooked portion of arms 95 contact pins 91 and 93. This tends to break ball 25 loose from orifice 33 or 35 should the ball stick in one of the orifices. At this point in the cycle, flat portions 113 inside of actuators 105 and 107 contact rods 101 and 103 to "stop" the rotation of ball 25 under the influence of springs 71 and 73. During further movement of member 31 in this direction flat portions 113 inside of actuators 105 and 107 continue to ride against rods 101 and 103 until tapered portions 109 and 111 of rods 101 and 103 ride against rods 101 and 103. Thereupon, further movement of member 31 permits springs 71 and 73 torsionally to rotate ball 25 in a first direction tending to line up the axis of aperture 27 with the axes of orifices 33 and 35. Such further movement of actuators 105 and 107 allows the axis of aperture 27 of ball 31 to line up with the axes of orifices 33, 35 fully to open valve 23 and to provide a line of sight from passageway 17 through valve 23 into chamber 13 as shown by FIG. 4. Thus spectrographic and other visual determinations of the contents of chamber 13 can be made. Should variable expansion or movement take place between passageway 17 and duct 15, a bellows inserted in one of the ducts will allow for such a differential expansion or movement.

To close valve 23 from its open position, to complete a cycle of operation, housing 57 rotates against balls 65 which slip in groove 70 in housing 57 to move member 31 toward member 29 (to the left in FIG. 1). This causes tapered portions 109 and 111 of actuators 105 and 107 to push against rods 101 and 103 thus to rotate ball 25 in a second direction tending to turn the axis of ball aperture 27 at an angle to the axes of orifices 33 and 35. When the axis of aperture 27 is at right angles to the orifice axes, the rods 101 and 103 slip off of tapered portions 109 and 111 and onto flat portions 113 inside of actuators 105 and 107 where the further rotation of ball 25 in this direction is "stopped." Further movement of member 31 compresses ball 25 equally between members 29 and 31 while ball 25 remains in this "stopped" position. Thereupon the valve 23 is in the closed position shown in FIG. 1 where another of the described cycles may begin.

This invention has the advantage of providing a bakeable, double-seal valve in which there is no frictional rotation of a ball against a stationary seat and there is no means passing through a valve body and gasketing for rotating the ball. Moreover, the valve of this invention provides a novel, simple and relatively maintenance-free system in which the resilient ball is resiliently and torsionally centered between the relatively movable seating members to accommodate expansion and contraction of the members and to turn the ball and the ball is turned by internal means enclosed within the members. Additionally, the valve of this invention meets low leakage requirements because of features including the advantage that the force between the ball and the two orifices is equalized.

I claim:

1. A double-seal valve for opening and closing duct sections that communicate with a chamber evacuated to a high vacuum, comprising a relatively hard metallic spherical ball having an axial passageway therethrough toward which the ball surface is elastic, relatively moveable first and second members having coaxial orifices communicating with said ducts and formed with narrow circular relatively soft metallic edges on opposite sides of said ball, bearings for said ball having resilient spring means connected in said first member so as to rotatably float the axis of said passageway in a plane substantially corresponding with the plane of said orifice axis, actuating means for selectively moving said second member axially toward and away from said first member with a large variable force selectively to compress and release said ball between said soft edges, resilient bellows connecting said first and second members and forming a chamber with said ball and said soft edges inside said actuating means when said ball is compressed between said soft edges, means for evacuating said chamber, and means inside said actuating means for rotating said ball simultaneously with the movement of said second member so as substantially to line up the axis of said passageway with the orifice axis as said second member is moved away from said first member and to turn the axis of said passageway toward a position that is normal to the orifice axes as said second member is moved toward said first member.

2. A double-seal valve for opening and closing duct sections that communicate with a chamber evacuated to a high vacuum, comprising a relatively hard metallic spherical ball having an axial passageway therethrough so that said ball is resilient, a stationary first member having an orifice communicating with one of said duct sections, an axially moveable second member having an orifice and a resilient bellows connecting said second member with the other duct section, said orifices having narrow circular relaitvely soft metallic edges adjacent opposite sides of said ball, bearings for said ball having resilient springs connected to said first member on opposite sides of said ball normal to the axis of said orifices so as to rotatably float the axis of said passageway in a plane substantially corresponding to the plane of said orifice axes, an actuating member having a rotatable housing threaded on said first member and a connection with said second member that is slideably engageable with said second member for selectively moving said second member axially toward and away from said first member with a large variable force and selectively to compress and release said ball between said soft edges, resilient bellows connecting said first and second members and forming a chamber with said ball and said relatively soft edges inside said actuating member when said ball is compressed between said soft edges, means for evacuating said chamber so that leakage across one of said soft edges is prevented from leaking across the other of said soft edges, and means completely enclosed inside said actuating member for rotating said ball simultaneously with the movement of said second member so as substantially to line up the axis of said passageway with the orifice axes as said second member is moved away from said first member and to turn the axis of said passageway toward a position that is normal to the orifice axes as said second member is moved toward said first member.

3. A double-seal valve, comprising a temperature resistant resilient ball formed with an aperture therethrough, temperature resistant members having orifices therethrough, flexible sealing means connected between said members so as to enclose a space around said ball, means for moving said members relatively toward and away from each other to compress and release the ball in said space, spring means connected to one of said members for resiliently centering the axis of said passageway in a plane corresponding with the plane of the orifice axes and tending to rotate said ball in one direction, means operable upon movement of said members toward each other to rotate the ball in a direction opposite to the direction in which said spring means tends to rotate said ball whereby the axis of said passageway is prevented from lining up with said orifice axis when said ball is compressed between said members, and means operable upon movement of said members away from each other to rotate said ball in the same direction in which said spring means tends to rotate said ball should said spring means be insufficient to rotate said ball to line up the axis of said passageway with said orifice axes.

References Cited in the file of this patent

FOREIGN PATENTS

| 189,162 | Great Britain | Nov. 13, 1922 |
| 1,060,677 | Germany | July 2, 1959 |